United States Patent [19]

Frampton et al.

[11] Patent Number: 4,614,376
[45] Date of Patent: Sep. 30, 1986

[54] HANDLE

[75] Inventors: Jeffery A. Frampton, Begnins, Switzerland; Nicholas Bartman, Aylesbury, England

[73] Assignee: Idex (Jersey) Limited, St. Helier, Channel Islands

[21] Appl. No.: 577,701

[22] Filed: Feb. 7, 1984

[51] Int. Cl.⁴ ............................................. B60J 7/18
[52] U.S. Cl. .................................... 296/224; 292/263
[58] Field of Search ............... 296/224, 216, 218, 223; 292/263; 49/394

[56] References Cited

U.S. PATENT DOCUMENTS

| | | | |
|---|---|---|---|
| 4,067,605 | 1/1978 | Green et al. | 296/224 |
| 4,186,525 | 2/1980 | Carvalho | 49/394 |
| 4,257,632 | 3/1981 | DeStepheno | 292/263 |
| 4,351,561 | 9/1982 | Tuchiya | 296/216 |

Primary Examiner—Robert R. Song
Attorney, Agent, or Firm—Webb, Burden, Robinson & Webb

[57] ABSTRACT

An opening handle for a front-pivoted sunroof panel, comprises a shell 11 with transverse forward pivot axis 14 for attachment to the panel and transverse rearward axis 19 carrying a ratchet drum 29 with parallel arms 27 themselves defining a pivot axis 28 at their outer ends for attachment to the vehicle roof. A flexible panel plate 12 lies inside the shell 11 with a rear edge 25 lying as a detent in the ratchet. Well 24 defines a protrusion extending through the shell at 16. When the shell is pulled pivots 28,19 and 14 are all operative to open the panel; the ratchet 29 permits maintained stepwise opening. When the protrusion (well 24) is pressed the detent edge 25 is moved away from the ratchet, allowing rapid closure of the panel.

9 Claims, 8 Drawing Figures

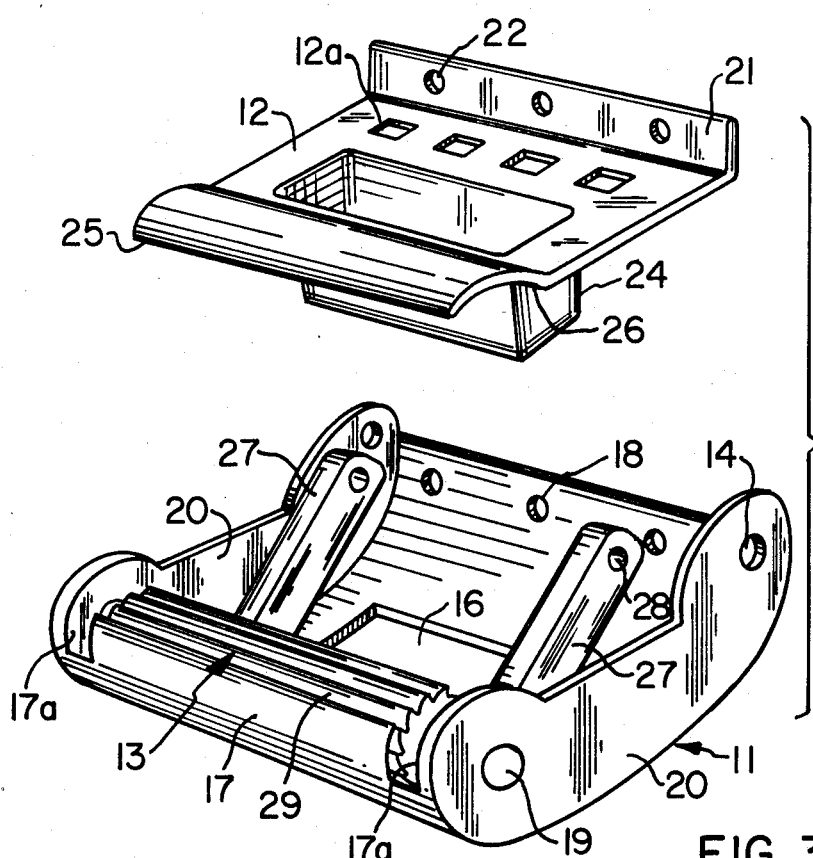
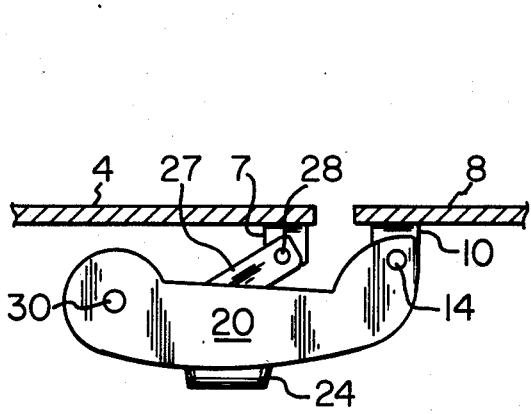
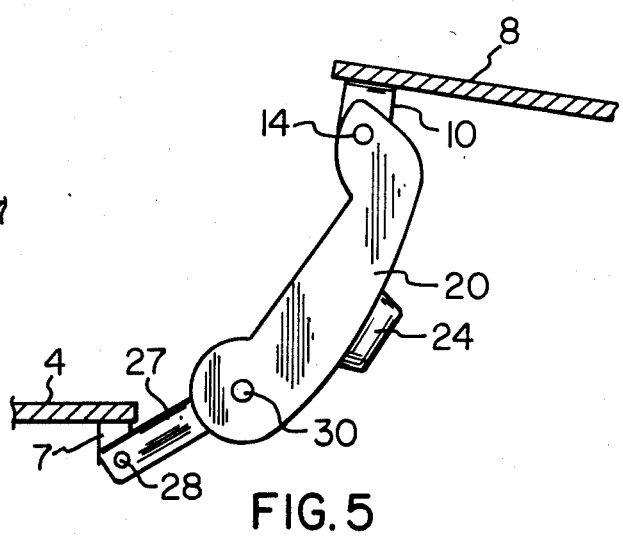

HANDLE

FIELD OF THE INVENTION

This invention relates to a handle for opening a hinged flap member, more especially a horizontal openable panel mounted as the sunroof of a motor vehicle.

Usually such sunroof panels are made of toughened glass, to allow extra light into the vehicle, and are openable to increase ventilation at a rearward edge. They are hinged at the front edge, and a novel example of a demountable hinged front edge is shown in our copending U.S. application Ser. No. 577,865 of even date.

A hinged sunroof operating handle, to be acceptable to customers, must be subject to certain design constraints. It must be easily operable, without inspection by a driver whose attention is on the traffic. It should generally be openable, and capable of being kept open, in a succession of definite stages. By virtue of legal requirements it should not unduly obstruct the overhead space, in case an entering driver or passenger should bump against it, and it should be closable rapidly with a simple action; moreover, any impact from the rear e.g. passenger impact in an accident, should tend to open the panel.

SUMMARY OF THE INVENTION

In one aspect the invention provides:

a handle permitting the stepwise maintained opening of a flap, such as a sunroof panel for an automobile, pivoted at or towards a forward edge thereof, comprising:

(a) an outer shell adapted for pivotal connection at a forward edge thereof to the rearward edge of the panel, and having means defining a transverse pivot axis at or towards a rear edge thereof, (b) an attached or integral internal pawl plate, a transverse edge of which at or near the rearward portion thereof acts as a releasable detent means with (c) a ratchet member journalled around the shell rearward pivot axis and having at least one arm extending away from the axis adapted to pivot at the other end about a further pivot axis connected to the vehicle roof or to a component fixed in relation thereto.

In another aspect the invention provides a handle permitting the stepwise maintained opening of a flap, such as a sunroof panel for an automobile, pivoted at or towards a forward edge thereof, comprising:

(a) an outer shell adapted for pivotal connection at a forward edge thereof to the rearward edge of the panel, having an aperture in an undersurface thereof and having means defining a transverse pivot axis at or towards a rear edge thereof, (b) an internal pawl plate, attached or integral at a forward edge thereof within a forward portion of the outer shell, for resilient relative movement, having (i) a downwardly extending protrusion located within the shell aperture and (ii) a transverse edge at or near the rearward portion thereof as a detent means with (c) a transversely extending ratchet drum, journalled around the shell rearward pivot axis and having parallel arms, extending away from the said axis, adapted to pivot at their other ends about a further transverse pivot axis connected to the vehicle roof or to a component fixed in relation thereto.

The handle can be formed of moulded synthetic polymeric material, which can impart the necessary flexibility to the shell/pawl plate interconnection. The pawl plate itself may alternatively be metal.

The pawl plate can terminate in a detent edge; in such a case the shell may be rounded to overlie such an edge. Alternatively the pawl plate itself may overlie the ratchet drum and a projecting transverse detent be provided to extend from its lower surface.

The assembly of the handle to the sunroof panel and vehicle roof (or frame surround) is also an aspect of the invention.

BRIEF DESCRIPTION OF THE DRAWINGS

The invention will be further described with reference to the accompanying drawings wherein like reference numerals are used with like parts, in which:

FIG. 3 is an exploded view of FIG. 1.

FIG. 4 shows a handle of FIG. 1 in a closed position.

FIG. 5 show a handle of FIG. 1 in an open position.

DESCRIPTION OF THE PREFERRED EMBODIMENTS

Figure 1:
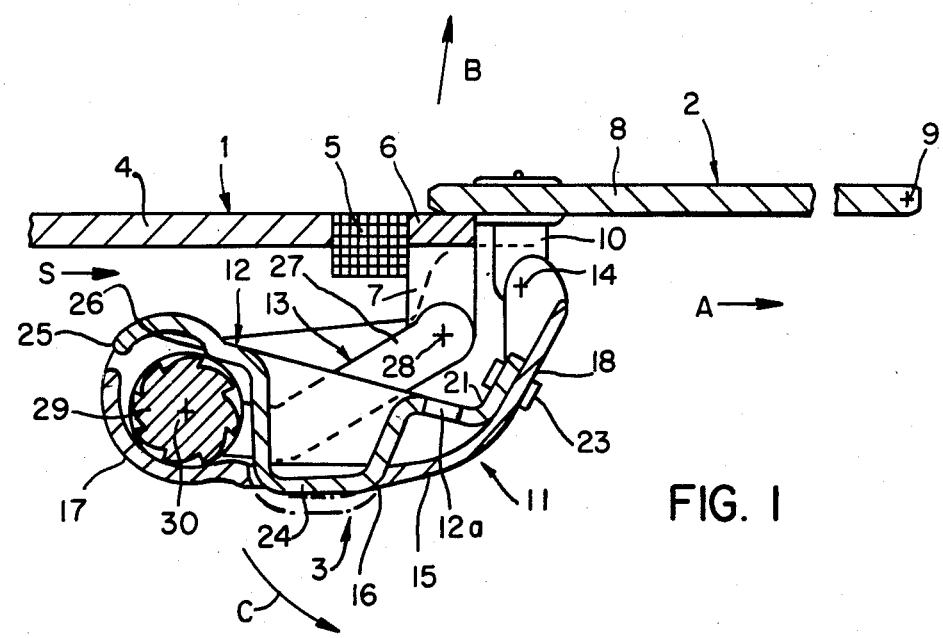
FIG. 1 shows a central longitudinal section through the assembled handle.

FIG. 1 shows a vehicle roof surround structure 1, a sunroof structure 2, and a handle 3.

The vehicle roof surround structure 1 possesses a roof panel 4, sunroof aperture surround 5, surrounding elastomeric seal 6 and downwardly extending handle-fixing pivot lugs as shown at 7. These features are only shown diagrammatically since they are well known per se, can vary in detail, and do not form part of the handle of the present invention.

The sunroof structure 2 is basically a toughened glass panel 8, pivoted at 9, at or near a forward edge, and provided with downwardly extending lugs as at 10 passing through the glass to give pivot points between the sunroof-structure and the handle. Alternatively, a single fixing bar can be used. Again, the exact nature of the sunroof, and its forward pivot structure, can vary, although the structure shown in our copending U.S. application Ser. No. 577,865 is of particular value. Preferably lugs 7 and 10 abut positively when the sunroof panel is closed.

Figure 2A:
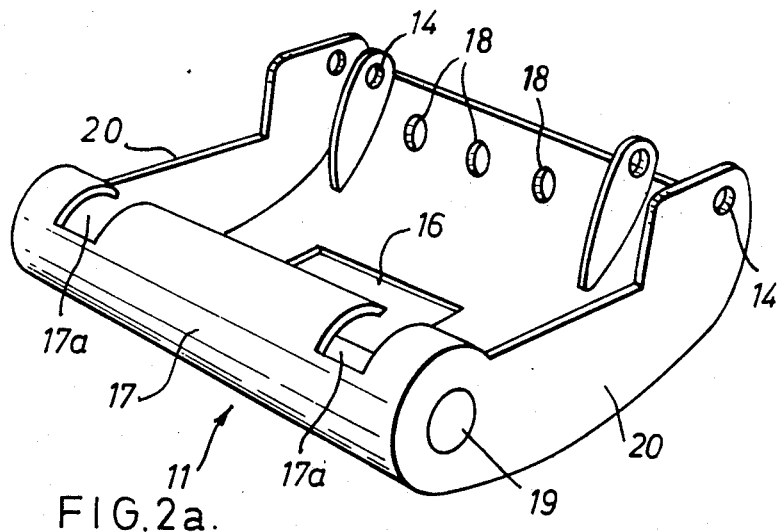
FIGS. 2a, 2b and 2c show in perspective the three main component parts, as dismantled, of a handle modified in minor respects.
Figure 2B:
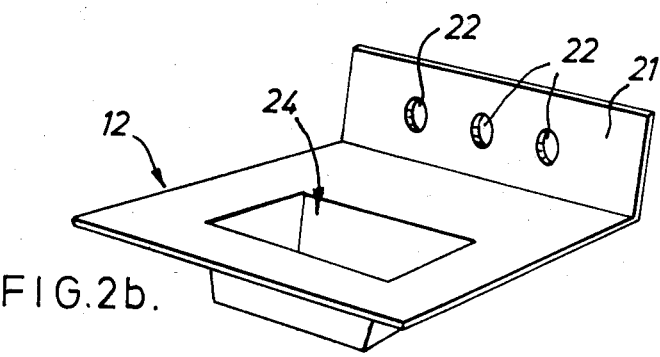
Figure 2C:
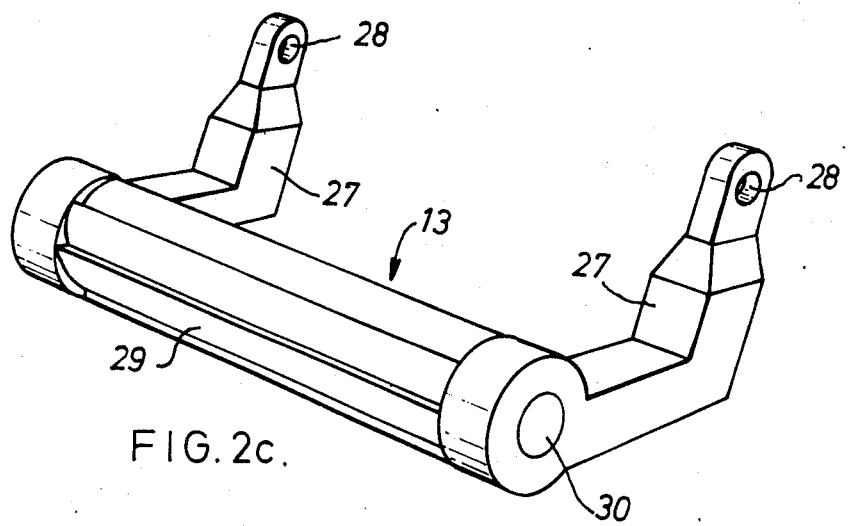

The handle 3 is in three parts: an outer shell 11 (FIG. 2a), an inner pawl plate 12 (FIG. 2b) and an inner ratchet structure 13 (FIG. 2c).

The outer shell 11 is pivoted at 14, one pivot on each side, to lugs 10. It has a smooth base portion 15 with generally central aperture 16 and a rounded rear edge 17 with two notches 17a formed therein. (Reference to front and rear edges is herein defined as being relative to vehicle movement, shown by arrow A). Fixing holes 18 are located in the front edge and pivot holes as at 19 are provided in alignment at each side wall 20.

Figure 1A:
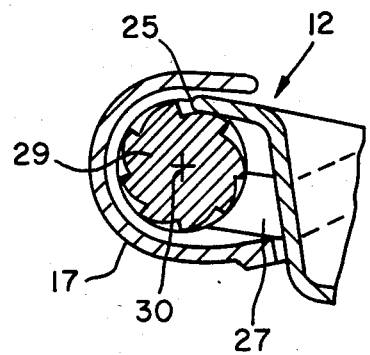
FIG. 1a shows a variant of part of FIG. 1.

The pawl plate 12 has an upturned front edge 21 with fixing holes 22 therein, through which extends rivets or the like 23 which also pass through holes 18 in shell 11, so as to connect the two parts. Additionally, the pawl plate has a plurality of holes 12a formed therein adjacent to the front edge 21. In an alternative form, the plate is fastened to the base of the shell. A well portion 24 optionally with a central longitudinal rib extends below the central part of the pawl plate 12, and thus through aperture 16 in the shell 11 when assembled. The rear edge of pawl plate 12 forms a ledge 26 which acts as a detent (FIG. 1). In the embodiment shown in FIGS. 1a and 2b the rear edge 25 of the plate itself acts as a detent, and the curved rear shell edge overlies the rear edge 25.

The ratchet structure 13 (FIG. 2c) has side arms 27 pivoted at 28 to lugs 7. Connecting these arms is an elongate ratchet drum 29, to cooperate either with detent ledge 26 (FIG. 1) or plate edge 25 (FIGS. 1a and 2b) in the alternative version. This ratchet drum 29 is journaled at 30 on a shaft passing through pivot holes 19.

The handle components may be made of moulded synthetic polymeric material. The pawl plate 12, at least, should be flexibly mounted in relation to the shell 11. The use of synthetic polymer facilitates this, and relative flexibility can be adjusted by provision of holes 12a where shown in FIG. 1.

To raise the sunroof structure 2, so that its rear edge moves in the direction of arrow B, around front pivot 9, the driver or passenger reaches up and back, locates his fingers in space S, and pulls the handle 3 downwards. As he pulls, the detent ledge 26 is pulled into engagement with the ratchet drum 29 (FIG. 1). In an alternative, flexible rounded edge 17 is deformed and pushes edge 25 into such engagement (see FIG. 1a). In either case the pawl plate 12 moves down, e.g. so that the well is in a position shown in dotted lines in FIG. 1.

The handle 3 pivots about pivot point 28. However, because the ratchet is held against relative clockwise movement by detent ledge 26 (or edge 25) the shell 11 is displaced. It is constrained at pivots 14 by the only possible sunroof movement, and thus moves upwards, adjusting its angle at 14 relative to the sunroof, and eventually rotating in relation to the ratchet drum 29 until the ratchet clicks, relatively anticlockwise. Thus the ratchet drum moves in direction of arrow C.

The arms 27 of the ratchet structure 13 will therefore progressively take up a different angle with the shell 11 and associated pawl plate 12, and each tooth of the ratchet represents a different such angle and thus a different, stepped, extent of maintained opening. Notches 17a permit particularly wide opening of the sun roof as the arms 27 are received in the notches.

To close the sunroof, the driver or passenger merely has to reach up, squeeze the shell 11 to press on the well portion and move the shell towards the rear. Pressing well portion 24 inwards disengages the ratchet and detent ledge 26 (or 25) so that the flap can be rapidly closed.

While preferred embodiments of the invention have been described herein, it will be understood that the invention may be embodied within the scope of the appended claims.

We claim:

1. A handle for permitting the stepwise opening of the rearward edge of a vehicle roof panel that is pivoted at the forward edge, said handle comprising an outer shell having a base portion with a rounded rear edge defining a shaft pivot axis and, spaced opposed side walls attached to said base portion to means for connecting the front edge of said base portion to said rearward edge of said roof panel, a ratchet structure including a pair of spaced side arms and an aperture at the front end of each of said side arms adapted to pivotally connect said ratchet structure to a vehicle roof lug, and a ratchet drum rotatably mounted between said side arms and located at said shaft pivot axis of said outer shell, and detent means for contacting said ratchet drum of said ratchet structure.

2. A handle as set forth in claim 1 wherein said means for connecting the front edge of said base portion to said rearward edge of said roof panel comprises a pair of spaced, pivotal extensions attached to and protruding inwardly from said base portion of said outer shell.

3. A handle as set forth in claim 1 wherein said detent means comprises a flexible pawl plate having a transverse rearward ledge for engagement with said ratchet drum, and means flexibly mounting said pawl plate on said outer shell.

4. A handle as set forth in claim 3 wherein said pawl plate is made of metal.

5. A handle as set forth in claim 3 wherein said outer shell, said pawl plate and said ratchet structure are moulded from a synthetic polymeric material.

6. A handle for permitting stepwise opening of the rearward edge of a vehicle roof panel that is pivoted at the forward edge, said handle comprising an outer shell having a base portion with a central aperture formed therein and a rounded rear edge defining a shaft pivot axis, a pair of side walls attached to opposed edges of said base portion, and spaced pivotal extensions attached to and protruding inwardly from said base portion and adapted to be connected to said rearward edge of the roof panel, a flexible pawl plate having a well portion for engagement with said central aperture in said base portion of said outer shell and at least one hole intermediate said well portion and the front edge of said pawl plate, means for attaching said pawl plate to said outer shell, and a ratchet structure including a pair of spaced side arms and an aperture formed in each of said side arms for pivotal connection of said ratchet structure to a vehicle roof lug, and a ratchet drum rotatably mounted between said side arms and located at said shaft pivot axis of said outer shell.

7. A handle as set forth in claim 6 wherein said rear edge of said base portion overlaps the transverse rear edge of said pawl plate by a variable amount.

8. A handle as set forth in claim 6, wherein said outer shell, said pawl plate and said ratchet structure are moulded from synthetic polymeric material.

9. A handle as set forth in claim 6, wherein said pawl plate is made of metal.

* * * * *

UNITED STATES PATENT AND TRADEMARK OFFICE
CERTIFICATE OF CORRECTION

PATENT NO. : 4,614,376

DATED : September 30, 1986

INVENTOR(S) : Jeffrey A. Frampton et al.

It is certified that error appears in the above-identified patent and that said Letters Patent is hereby corrected as shown below:

Claim 1 Column 4 Line 3 Delete --,--.

Claim 1 Column 4 Line 4 "to" (second occurrence) should read --,--.

Signed and Sealed this

Third Day of February, 1987

Attest:

DONALD J. QUIGG

Attesting Officer

Commissioner of Patents and Trademarks